United States Patent
Eccles et al.

[15] 3,695,115
[45] Oct. 3, 1972

[54] MONITORING DEVICE FOR VEHICLE BEHAVIOUR

[72] Inventors: Anthony John Eccles, 16 Lefton Park Rd., Liverpool 8; Alistair Donald Mant, 35 Trinity Court Grays Inn Road, London; Barry Owen Shorthouse, Liverpool, all of England

[73] Assignee: said Eccles and Mant, by said Shorthouse

[22] Filed: Nov. 12, 1971

[21] Appl. No.: 98,389

[30] Foreign Application Priority Data
Nov. 16, 1970 Great Britain..........54,463/70

[52] U.S. Cl........................................73/510, 73/516
[51] Int. Cl...............................................G01p 15/02

[58] Field of Search........73/510, 511, 492, 514–517; 200/61.45, 61.48, 61.51; 340/262, 66, 71, 72

[56] References Cited

UNITED STATES PATENTS

| 2,794,082 | 5/1957 | Germaine | 340/72 X |
| 3,372,386 | 3/1968 | Klinger | 200/61.48 X |
| 3,431,556 | 3/1969 | Johnson | 200/61.45 R X |

*Primary Examiner*—James J. Gill

[57] ABSTRACT

The invention comprises apparatus for mounting in a vehicle, which monitors the horizontal acceleration of the vehicle, and which signals when a level of acceleration is exceeded, the level at which a signal is made being determined by and varied with the speed of the vehicle.

20 Claims, 9 Drawing Figures

MONITORING DEVICE FOR VEHICLE BEHAVIOUR

This invention relates to devices for monitoring the behavior of a vehicle, and primarily a road vehicle. It may be used by a driver or a driving instructor to provide a term of reference for so-called harsh driving whether as to braking, accelerating or over-fast cornering or to road-adhesion laterally e.g. as related to skidding, or to the behavior of the suspension system in regard to roll. The device may simply actuate an observed instrument, e.g. giving a light-signal or buzz, or it may provide a record of events in a given journey.

An accelerometer may be so applied as to indicate only one level of acceleration e.g. of too severe braking and to indicate the duration in which such a level is reached or exceeded. When such an arrangement is used to indicate the standard of a driver's performance, e.g. by integrating the indication to form a total of marks or penalties for a test journey, it is possible to "cheat" by braking excessively harshly thereby decreasing the duration of the penalizing acceleration, even though a more gentle level of braking over a longer period is preferable. It is therefore possible to provide two or more levels to be indicated and recorded — e.g. a lower and a higher level — so that a fair "marking" will be possible.

When travelling in a vehicle, discomfort to a passenger caused by acceleration depends upon the sense of direction of the acceleration and upon the speed at which the vehicle is travelling when acceleration commences. For the sake of simplicity, the term "acceleration" as considered herein to include positive and negative acceleration in any direction e.g. braking, lurching lateral and centrifugal acceleration.

The degree of discomfort as dependent upon direction of acceleration is, of course, governed to a considerable extent by the shape of the vehicle seat and the amount of support it gives. The degree of discomfort, as dependent upon the speed at which acceleration commences, is thought to be largely psychological, insofar as a passenger in a vehicle travelling at low speeds is aware of the fact that the tyes, steering, brakes etc. are more effective than when travelling at high speeds; thus, he has more confidence in the ability of the vehicle to undertake comparatively violent acceleration at low speeds and therefore feels less discomfort.

The present invention thus seeks to provide for a vehicle acceleration monitoring apparatus which will give an indication of "excessive" acceleration, the level of acceleration which is selected as being excessive being dependent both on the sense of direction of the acceleration and upon the speed of the vehicle when acceleration commences. The device may be constituted as a portable and self contained instrument for the purpose of checking or demonstrating vehicle performance or for checking the skill of the driver or the instrument may be constituted as a fixture in the vehicle.

According to the invention, a vehicle acceleration monitoring apparatus comprises; accelerometer means responsive to the acceleration of the vehicle in a horizontal plane; signalling means actuated by the accelerometer means when the acceleration of the vehicle exceeds a level, which level is determined by and varied with the speed of the vehicle; vehicle speed sensing means whereby the level is varied.

The accelerometer means may in accordance with the invention comprise; at least one mass disposed in a housing for mounting in a vehicle and so constrained as to be capable of motion relative to the housing induced by horizontal acceleration of the vehicle but to be subject to a horizontal restoring force urging it to a neutral position relative to the housing; electrical detecting means for detecting when the mass is displaced from the neutral position such as, for example, a pair of electrical contacts which close or open when the mass is displaced, or which include an electrical transducer which provides an electrical signal proportional to or otherwise related to the position of the mass relative to its neutral position, which detecting means in co-operation with the speed sensing means produce an electrical output to thereby activate the signalling means when the displacement of the mass exceeds an amount determined by the speed sensing means.

If, for example, transducer means are included, the electrical output thereof requires to be monitored by a controllable gate which itself will produce an output when the electrical output of the transducer exceeds a level, which level can then be determined by feeding a signal from the speed sensing means to the controllable gate, the operating level of which is thereby adjusted. Such transducers can well be potentiometers provided with a voltage source, the wipers of which are movable by a pendulous or other mass. Normally two such potentiometers would be required, one operable in one sense of direction relative to the vehicle and the other in a sense of direction substantially at right angles to the first direction. An arrangement of this type is further described by way of illustration of the invention later in this specification. Transducers as strain gauges e.g. piezo-electrical crystals or electromagnetic types may be used. Transducers such as these can be arranged to indicate acceleration over 360° and, together with suitable circuitry, to indicate when an "excessive" level of acceleration has been reached.

Further according to the invention, the accelerometer means may comprise; a pendulum freely and pivotally suspended having an electrically conducting surface forming a first electrical contact; a second electrical contact having an electrically conducting surface contactable by the first contact when the pendulum is displaced in any direction but spaced therefrom when the pendulum is in a neutral position, which second contact is movable to thereby vary the spacing between the contacts which movement takes place in response to changes of vehicle speed.

In order to allow for levels of acceleration which activate the signalling means not only determined by the speed of the vehicle but also by the angle of a resultant acceleration relative to the direction of vehicular motion (e.g. a forward acceleration due to braking from 60 Kilometers/hour may activate the signalling means at — ½g, whereas it may be desired to activate the signalling means when centripoetal acceleration due to cornering at 60 Kilometers/hour exceeds — ¼g,) the contact surface of the second (or first contact) contact may be profiled to thereby vary the spacing between contacts according to the required acceleration/direction relationship.

The accelerometer may, for example, be a pendulum, preferably damped by being immersed in oil, free to swing against contacts, arranged in position with respect both to distance from vertical and to distance from the pivot, so as to be actuated when the pendulum swings out of vertical by an angle corresponding to the predetermined level of acceleration. Two levels of acceleration can be indicated by, for example, employing two tiers of contacts. An accelerometer of this type is described in U.K. specification Pat. No. 1,092,933.

The accelerometer can be made dependent upon vehicle speed, so that it is more sensitive at high speeds than at low speeds, by coupling it to a device which is responsive to the vehicle's speed either directly by measurements of which speed, axle speed, propellor shaft or speedometer drive speed etc., or indirectly via some parameter of the vehicle which is a function of the vehicle's speed e.g. relative air speed, using a Pitot tube or the ram effect of air, etc.

The actual indication may be direct or via a relay, and may be recorded. The indication may, e.g. be as a light which is turned on by a pulse, or a buzzer, or by a solenoid-operated counter or by a chart recorder or any combination of these. To indicate the duration of undesirable acceleration, the contact may operate, for example, a pulse generator which emits pulses at regular intervals e.g. 10 per second, which can be linked to a pulse counter; or the contact may operate a constant velocity motor linked to a counter of the type used to indicate tape travel in tape recorders.

Although electrically operated apparatus has been described herein, this is not a limitation since it is obviously possible to perform the functions of the invention entirely by mechanical means. For instance the counter may be driven by a clockwork motor which is stopped and started by a brake, which brake is operated by displacement of a mass from a netural position, such as a pendulum for example. So that directional sensitivity may be varied, two pendulums, each free to swing in one direction only, at right angles to one another, may each act upon the brake. By varying the distance of the center of mass from the point of each pendulum, the brake will be operated sooner by an acceleration in one direction than by the same acceleration in the other direction.

To illustrate the present invention, reference will now be made, by way of example, to the accompanying drawings in which.

Figure 1:
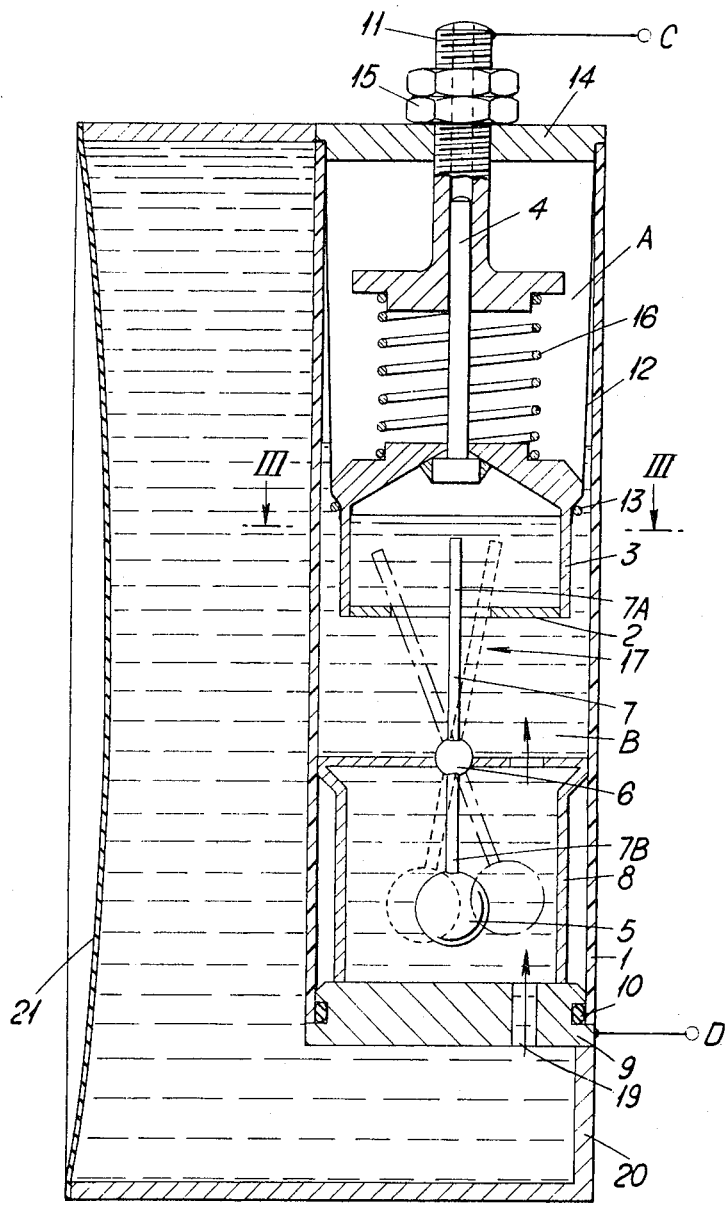
FIG. 1 is a longitudinal section through a vehicle acceleration monitoring apparatus.
Figure 2:
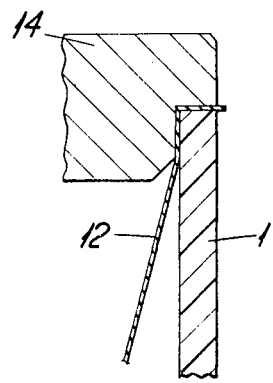
FIG. 2 is a detail of FIG. 1 on an enlarged scale.
Figure 3:
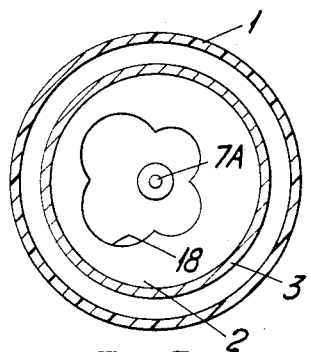
FIG. 3 is a section along the line III — III of FIG. 1.

As shown in FIG. 1, the apparatus comprises a perspex case 1 closed at the top by a brass sheath cap 14 and at the bottom by a brass sump cap 9. Suspended within the case 1 by a rubber sheath 12 is an electrically conductive profile disc housing 3 which supports an electrically conductive profile disc 2 having an opening 18 of predetermined profile as shown in FIG. 3. The sheath 12 is fluid-tightly fixed to the case 1 as shown in FIG. 2 and is fluid-tightly fixed to the housing 3 by a sheath ring 13 so that the sheath fluid-tightly divides the inside of case 1 into upper compartment A and lower compartment B. Extending upwards from housing 3 is a guide pin 4 which slides in an adjustable guide which is adjustably locked onto sheath cap 14 by locking nuts 15. Guide 11 and housing 3 are urged apart by spring 16. In compartment B, a pendulum 17, comprising a mass 5 fixed to the lower end 7B of a metallic contact arm 7, is supported by a pivot sphere 6 on a pivot bridge 8 which is attached to the sump cap 9 and braced against the inside of case 1. The upper end 7A of the arm 7 extends into housing 3 through the opening 18. The sump cap 9 is fluid-tightly fixed into case 1 by means of an O-ring seal 10 and a passage 19 extends through cap 9. Sheath cap 11 is electrically connected to a terminal C and cap 9 is electrically connected to a terminal D. The terminals C and D are connected to means for indicating excessive acceleration which depends upon the feature that when contact arm 7 touches the profile disc 2, the electrical path through the accelerometer from C to D is completed.

In use, the lower compartment B is filled with oil and the passage 19 is connected to a supply of oil whose pressure is a function of vehicle speed, as will be described hereafter, so that the pendulum is immersed in oil and thereby damped. As the speed of the vehicle increases and hence as the pressure of oil increases, oil is forced in compartment B and the housing 3 is forced upwards against spring 16 and away from pivot sphere 6. Thus, because of the greater distance of the profile disc 2 from the pivot sphere 6, a smaller deflection of the pendulum is required to cause the contact arm 7 to touch the disc 2 i.e. a smaller acceleration is required to complete the circuit. As can be seen from FIG. 3, the profile of the aperture 18 is such that different levels of acceleration are required to cause the end 7A to contact disc 2 according to the direction of the acceleration. The action of the adjustable guide 11 and spring 16 is to pre-set the range of fluid pressures over which the device will operate.

Within passage 19, there may be a limited-rate return valve to slow down the rate of escape of fluid from compartment B. The effect of such valve is to preserve the effect of high vehicle speeds so that if there is a rapid acceleration immediately after a sharp braking from high speed, the "memory" of the initial high speed is retained and the subsequent acceleration is treated accordingly. Thus the device will follow common experience in that e.g. rapid cornering after violent braking is more distressing than the rapid cornering by itself.

The source of damping oil is a casing 20 one side of which is a diaphragm 21 which is arranged so that it can be mounted on a vehicle, facing forwards. The casing 20 is filled with oil. As the vehicle moves forwards, the ram effect of the air pushes the diaphragm 21 inwards thereby pushing oil through the passage 19 and into compartment B to push up housing 3. In still air, the ram-effect is dependent upon the speed of the vehicle. To minimize the effect of ambient winds, the casing 20 can be mounted as close to the ground as possible, where wind speeds are minimal; the casing can also be mounted behind the vehicle radiator grill.

Figure 4:
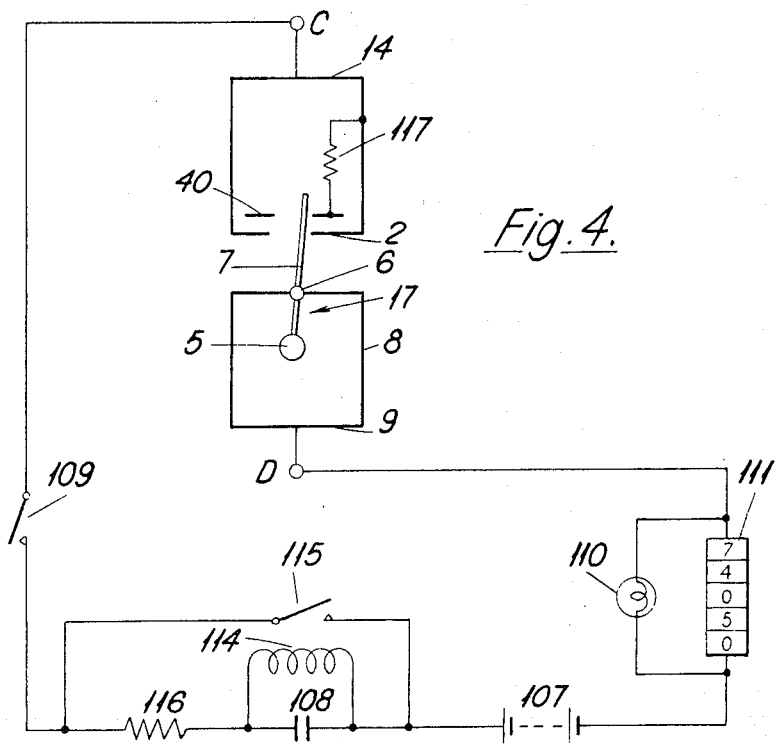
FIG. 4 is a circuit diagram of one embodiment.

As shown in FIG. 4, the indicator circuit comprises a capacitor/relay pulse generating unit which actuates an indicator arrangement. The capacitor/relay unit comprises a battery 107 connected, through terminal C to a capacitor 108 through a switch 109. The capacitor 108 is connected across a relay 114 having normally-open contacts 115. The capacitor 108 is connected to the terminal D through a resistance 116. The indicator arrangement comprises a lamp 110 in parallel with a pulse counter 111, the whole arrangement being a time counter.

In operation, the switch 109 is closed. As the vehicle accelerates, the mass 5 tends to maintain its position, therefore the pendulum 17 swings over by an amount dependent upon the level of acceleration. If the level of acceleration is sufficiently high, the contact arm 7 touches the profile disc 2 thereby completing the circuit and charging the capacitor 108 through the resistor 116. As the capacitor 108 is charged up, current is diverted through the relay 114 until the current is sufficient to close the contacts 115 when the capacitor/relay current is short-circuited so that the full battery voltage is across the lamp 110 and counter 111 thereby lighting the lamp and actuating the counter. The capacitor 108 is also short-circuited and discharges so that current flows preferentially through it so that the current in the relay 114 drops and the contacts 115 open thereby extinguishing the lamp 110 and de-actuating the counter 111. This process continues for as long as the contact between 7 and 2 is made. Thus, when the accelerometer reaches the pre-set level determined by the vehicle speed and direction of acceleration, the lamp 110 flashes and the counter 111 registers penalties for as long as the level is maintained.

Figure 5:
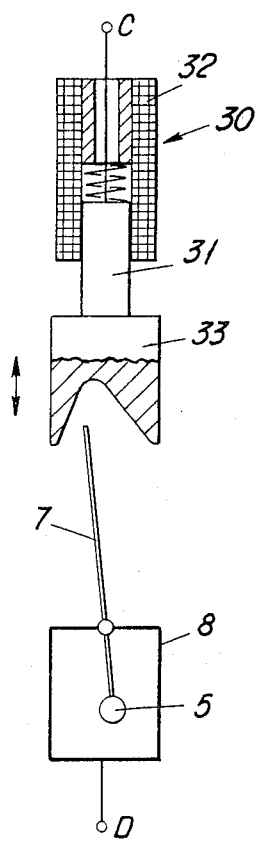
FIG. 5 is a longitudinal secton through another apparatus according to the invention.

Instead of oil pressure, the vehicle-speed adjustment may be made by other linear-acting means, such as the solenoid arrangement shown in FIG. 5. In this embodiment, a solenoid 30 is of the type in which the armature 31 extends against spring 34 to an extent dependent upon the value of the current passing through coil 32. The outer end of the armature carries a profile head 33 which overhangs the contact arm 7. The solenoid 30 is connected to a means for measuring vehicle speeds such as a tachometer whose output increases as vehicle speed increases. Thus, as vehicle speed increases, profile head 33 is lowered and a lower level of acceleration is required to cause an indication.

Figure 6:
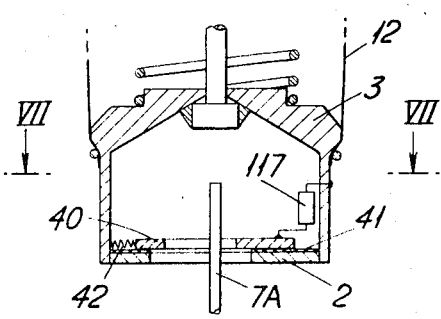
FIG. 6 is a longitudinal section through part of an apparatus similar to that shown in FIG. 1.
Figure 7:
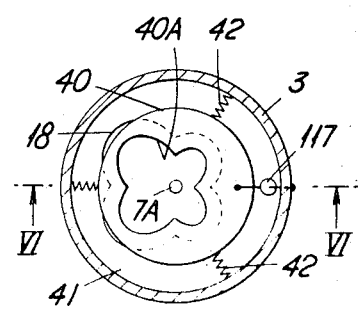
FIG. 7 is a section along the line VI — VI of FIG. 6.

Two levels of acceleration may be indicated by means of a supplementary profile disc 40 as shown in FIG. 6 and 7. The disc 40 rests on the disc 2 but is electrically insulated from it by a layer of insulation 41. Disc 40 is smaller than disc 2 and is maintained in a central position by three equidistantly spaced springs 42. Disc 40 is connected electrically to housing 3 through a resistance 117.

In operation, switch 109 is closed. During acceleration, the pendulum swings about the pivot sphere 6 until, when the first predetermined level of acceleration is reached, the end 7A contacts the disc 2 thereby completing the circuit. The capacitor/relay arrangement then operates causing the light 110 to flash and the counter to operate. On further acceleration the pendulum swings on against the springs 42 until, when the second predetermined level of acceleration is reached, the end 7A contacts the disc thereby short-circuiting the resistance 117. Due to the lower resistance, the current through the capacitor/relay arrangement is increased thereby increasing the frequency of relay operation cycle. Thus, when acceleration reaches a first predetermined level, the lamp 110 flashes and the counter 111 registers penalties; when acceleration reaches the increased, predetermined level of acceleration, the lamp 110 flashes at an increased frequency and the counter 111 registers penalties at the increased frequency.

Other forms of accelerometer may be employed, for example, a mass could be supported by strain guages and, with suitable electronic circuitry, arranged to resolve movement of the mass into signals indicating the direction and force of movement of the mass, which signals can be combined with signals from means responsive to vehicle speed, to actuate an indicator when acceleration reaches the pre-set level as determined by the vehicle speed and the direction of acceleration.

Figure 8:
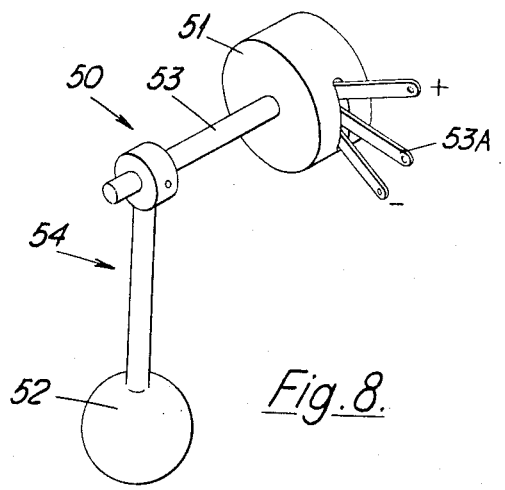
FIG. 8 is a view of a potentiometer accelerometer.
Figure 9:
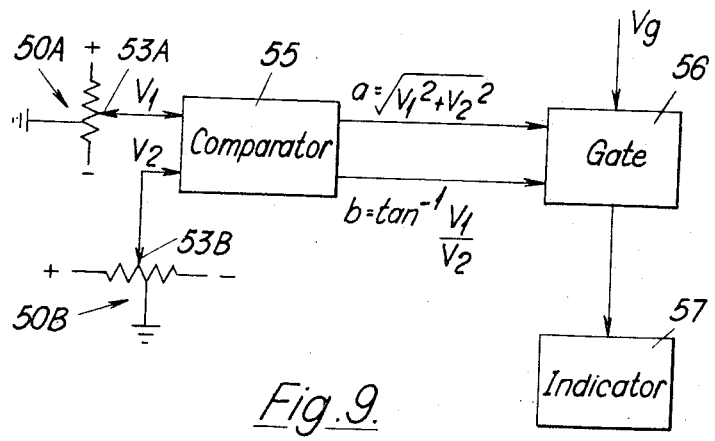
FIG. 9 is a block diagram of a vehicle acceleration monitoring apparatus having a circuit in which is employed the accelerometer of FIG. 8.

In the example shown in FIGS. 8 and 9, an accelerometer 50 comprises a potentiometer 51 which has a mass 52 attached to its wiper 53 to form a pendulum 54, so that when a voltage is applied across the potentiometer 51, the voltage of the wiper 53 is dependent upon the position of the pendulum 54. As shown in the circuit in FIG. 9, two accelerometers 50A and 50B are set at right angles to one another and has a voltage across it with a center earth or is at earth potential. The voltages $V_1$ and $V_2$ of the wipers 53A and 53B respectively are led to a comparator 55. The comparator 55 has two outputs — one indicating the total acceleration (a) as determined by the equation $a = \sqrt{V_1^2 + V_2^2}$ and the other indicating the angle (b) of the acceleration as determined by the equation $$b = \tan^{-1} \frac{V_1}{V_2}$$

. These two outputs are led to a gate 56 into which is also fed a signal $V_g$ which is a function of vehicle speed. The gate 56 is programmed to indicate when a predetermined acceleration, as determined by the direction of acceleration and by the vehicle speed, is reached.

The above described embodiments have described means for indicating the attainment of the predetermined levels of acceleration. Indication of the duration of these levels may also be achieved by introducing into the circuit other devices which operate for as long as the contacts are closed. For example, in FIG. 4 the capacitor/relay circuit may be replaced by a pulse generator e.g. a transistorized multivibrator and relay, which emits pulses at a fixed frequency, e.g. 10 per second. Thus the pulse counter 111 will register the pulses for as long as the contacts are closed. As an alternative arrangement, a constant speed motor can be used to drive a motorized switch or a counter directly for as long as the contacts are closed. The different levels of acceleration can be indicated e.g. by causing different resistances to be switched into the circuit so as to vary the motor speed.

The indicator may be of a type which leaves a permanent record e.g. a chart recorder and the lamps may be of the neon type for high-speed switching and reliability.

Other parameters of a vehicle may be suitable to provide a basis of response to vehicle speed. For example, pressurized fluid may be supplied to the accelerometer from servo-brake fluid or servo-steering fluid, or the fluid line in some automatic gear change systems which feeds-back vehicle speed to the system, or that pressure may be transduced into electrical signals by suitable means. The speed of the engine may be used using e.g. an electronic rev. counter, with suitable modification to allow for gear changes. Similarly the frequency generated by an alternator, the velocity of water flow through the engine cooling system may be employed.

I claim:

1. Vehicle acceleration monitoring apparatus for mounting in a vehicle which apparatus comprises;
   accelerometer means responsive to the acceleration of the vehicle in a horizontal plane;
   signalling means actuated by the accelerometer means when the acceleration of the vehicle exceeds a first level, which first level is determined by and varied with the speed of the vehicle;
   vehicle speed sensing means whereby said first level is varied.

2. Vehicle acceleration monitoring apparatus for mounting in a vehicle, which apparatus comprises;
   accelerometer means comprising, at least one mass disposed in a housing and so constrained as to be capable of motion relative to said housing induced by horizontal acceleration of the vehicle but to be subject to a horizontal restoring force urging it to a neutral position relative to said housing, and electrical detecting means for detecting when said mass is displaced by an amount from said neutral position and for producing an electrical output;
   signalling means which are activated by said electrical output;
   vehicle speed sensing means which gauge the speed of the vehicle and co-operate with said electrical detecting means to vary the amount of displacement of said mass required to produce said electrical output as the speed of the vehicle varies.

3. Apparatus according to claim 2 in which the electrical detecting means comprise;
   first and second electrical contacts spaced apart when said mass is in said neutral position;
   wherein said first contact is moved towards or away from said second contact in response to motion of said mass relative to said housing, and wherein the position of said second contact is varied by said speed sensing means as the speed of the vehicle varies.

4. Apparatus according to claim 2 in which the electrical detecting means comprise;
   transducer means which produce a first electrical output related to the displacement of said mass;
   controllable gate means which prodce a second electrical output to thereby activate said signalling means when the level of said first output exceeds a magnitude determined by a gate-controlling signal from said speed sensing means.

5. Apparatus according to claim 4 in which the transducer means comprise;
   a potentiometer connected to a source of electrical energy in which the wiper moves in response to movement of said mass.

6. Apparatus according to claim 4 in which said transducer means comprise;
   first and second potentiometers connected to a source of electrical energy;
   a first said mass arranged to act upon the wiper of said first potentiometer so that it moves in response to movement of said first mass in a first horizontal direction;
   a second said mass arranged to act upon the wiper of said second potentiometer so that it moves in response to movement of said second mass in a second horizontal direction which is substantially at right angles to said first horizontal direction;
   an electrical comparator which receives the voltage picked-off by the wiper of each said first and second potentiometers and produces said first electrical output related to the square root of the sum of the squares of the wiper voltages.

7. Apparatus according to claim 6 in which said comparator produces a further electrical output related to the angle between the direction of an acceleration and the direction of vehicular motion, which further output is also fed to said controllable gate means to thereby modify the magnitude of said first output level determined by said speed sensing means.

8. Apparatus according to claim 1 further comprising means for determining the angle between the direction of acceleration and the direction of vehicular motion and for modifying said first level in relation to said angle as determined by said speed sensing means.

9. Vehicle acceleration monitoring apparatus which comprises a housing for mounting in a vehicle and in which is;
   a first electrical contact comprising a pendulum freely and pivotally suspended having an electrically conductive contacting surface;
   a second electrical contact having an electrically conductive surface contactable by said first contact when said pendulum is displaced in any direction from a neutral position, but spaced therefrom when said pendulum is in said neutral position, speed sensing means which gauge the speed of said vehicle and act upon to move said second contact so that the spacing between said first and second contacts varies as the vehicle speed varies;
   signalling means activated when the said first and second contacts touch one another.

10. Apparatus according to claim 9 in which the contactable surface of one of said first and second contact is profiled to thereby determine the amount said pendulum must be displaced in any particular direction in order to cause said first and second contacts to touch.

11. Apparatus according to claim 10 in which the second contact is a substantially annular ring of electrically conductive material encircling the pendulum in spaced relationship and movable in a vertical plane relative thereto in response to variations in vehicular speed.

12. Apparatus according to claim 11 in which said housing contains damping fluid.

13. Apparatus according to claim 12 in which said speed sensing means cause the pressure of said fluid to vary as the vehicular speed varies and in which said second contact moves in response to fluid pressure variations.

14. Apparatus according to claim 1 in which said speed sensing means gauge vehicular speed by direct mechanical coupling with the transmission of said vehicle.

15. Apparatus according to claim 1 in which said speed sensing means comprise a tachometer which produces an electrical signal related to the vehicular speed.

16. Apparatus according to claim 1 in which said speed sensing means gauge vehicular speed as a result of aerodynamic forces due to the different relative velocities of the vehicle and the air through which it moves.

17. Apparatus according to claim 1 in which said signalling means comprise a time counter which when activated count at a first predetermined rate.

18. Apparatus according to claim 2 in which said signalling means comprise a time-counter.

19. Apparatus according to claim 9 in which said signalling means comprise a time-counter 20. Apparatus according to claim 17 further comprising means whereby a second level of acceleration may be determined and varied with the speed of said vehicle and which causes the signalling means to count at a second pre-determined rate.

* * * * *